United States Patent [19]

Williams

[11] 3,964,767
[45] June 22, 1976

[54] ANTI-SWAY TRAILER HITCH
[76] Inventor: Berdell Williams, P.O. Box 104, Tipton, Mich. 49287
[22] Filed: Mar. 19, 1975
[21] Appl. No.: 559,919

[52] U.S. Cl. .............................. 280/446 B; 280/457; 280/477
[51] Int. Cl.² .......................................... B60D 1/00
[58] Field of Search ............ 280/446 R, 446 B, 457, 280/461 R, 477, 480, 482, 483, 513

[56] References Cited
UNITED STATES PATENTS

| | | | |
|---|---|---|---|
| 2,325,822 | 8/1943 | Whitmer | 280/513 X |
| 2,452,785 | 11/1948 | Olney | 280/457 X |
| 2,459,965 | 1/1949 | Robertson | 280/457 X |
| 2,729,470 | 1/1956 | Seitz | 280/483 |
| 3,305,246 | 2/1967 | Gonczy et al. | 280/446 B |

Primary Examiner—M. H. Wood, Jr.
Assistant Examiner—John A. Pekar

[57] ABSTRACT

A composite trailer tow bar has a bifurcated rearward portion terminating in parallel pointed pins which fit into laterally-spaced holes in a vertically-movable adjustable plate attached to an elongated angle bracket secured as by welding to the converging trailer frame side members at the forward end of the trailer frame. Mounted on a support plate secured to the forward end of the trailer frame is a vertical trailer jack which extends downward between the bifurcated portions of the tow bar. Secured to the top and bottom of the latter are gusset plates, the upper one of which carries a rearward coupling ball adapted to receive a coupling socket on the forward end of the trailer frame. The forward portion of the tow bar terminates in a forward coupling socket which is adapted to engage a forward coupling ball, the center of which is in substantially the same horizontal plane as the axis of the rear axle housing of the towing vehicle and is positioned immediately behind the differential housing thereof. The stem of the forward coupling ball is mounted on a cross beam secured at its opposite ends to two bracket plates depending from the opposite frame side members of the towing vehicle. The cross beam and these plates carry cable guide eyes at the top and bottom thereof slidably receiving flexible steel coupling-assist cables connected at their lower ends to the ends of forwardly-diverging safety chains hooked at their rearward ends to an anchorage eye depending from the tow bar. The upper portions of the coupling-assist cables extend rearwardly through rearward guide eyes at the rearward ends of the towing vehicle side members, and then pass perpendicularly in opposite directions therebetween and terminate in hooks detachably connected to the rearward eyes.

9 Claims, 7 Drawing Figures

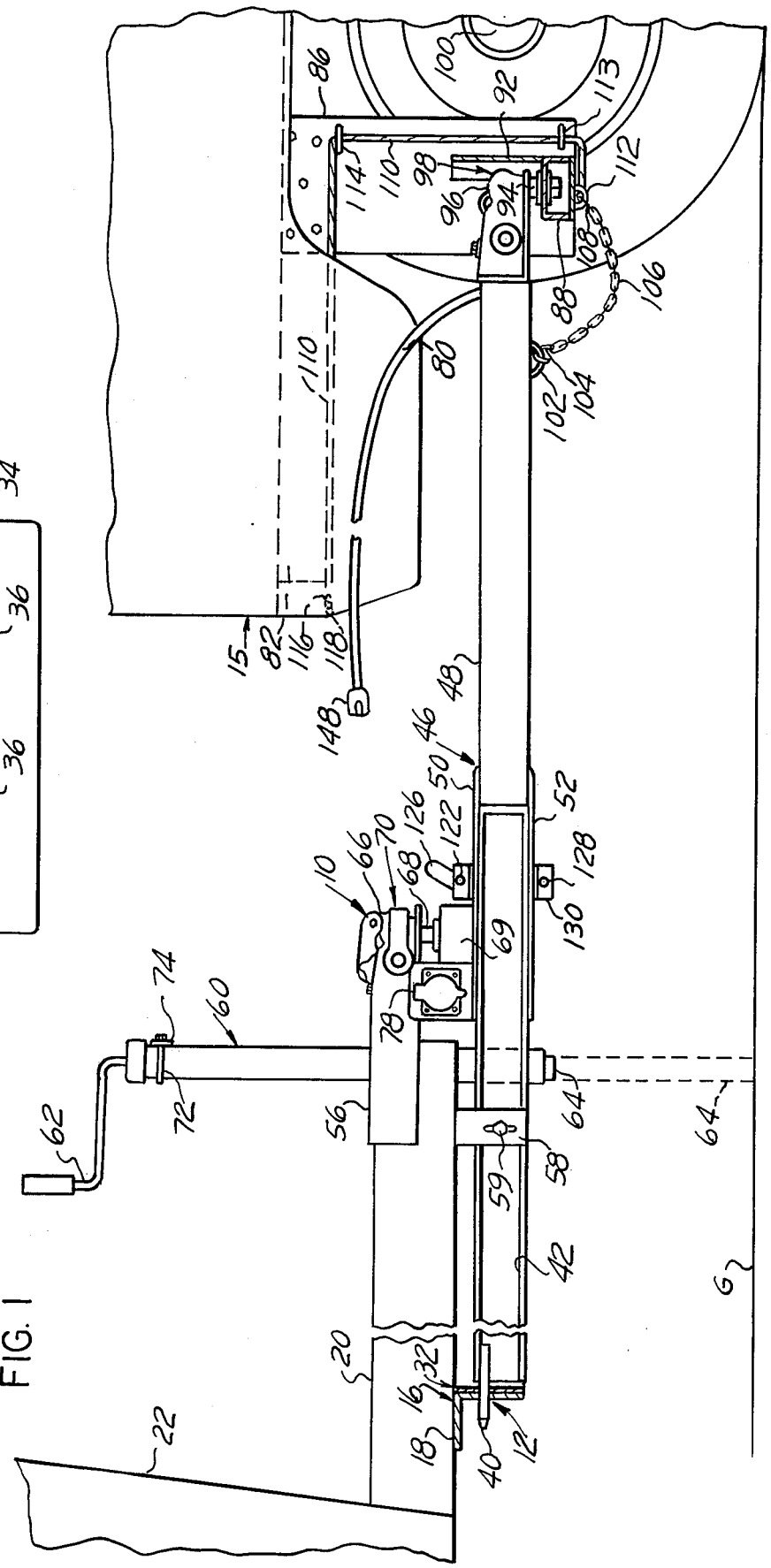

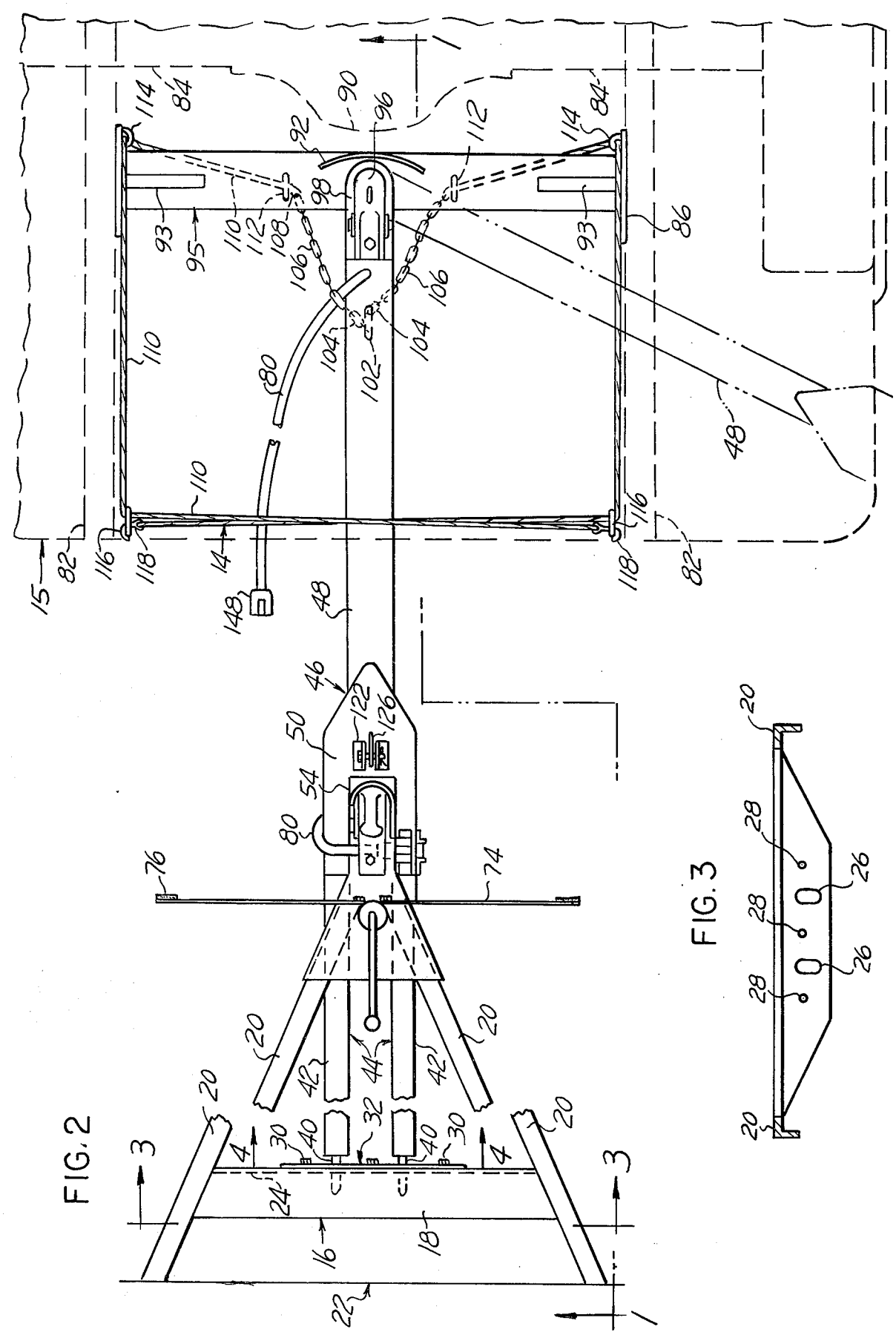

ANTI-SWAY TRAILER HITCH

SUMMARY OF THE INVENTION

The invention particularly resides in the mounting of the forward coupling ball and socket on the forward end of the tow bar immediately behind the differential housing in substantially the same horizontal plane as the axis of the rear axle of the towing vehicle where it minimizes side sway of the trailer and greatly facilitates backing of the trailer by the towing vehicle. The invention further resides in the flexible cables connected to the safety chains and extending through the four sets of eyes to the rearward end of the vehicle frame where they can be conveniently anchored after being used to draw the ball socket at the forward end of the tow bar into coupling engagement with the ball thereof without requiring the operator to crawl under the towing vehicle to couple the trailer thereto. The invention still further resides in the bifurcated tow bar with the trailer jack extending therethrough and with its rearwardly-projecting parallel pins adapted to register with enlarged holes in an adjustment plate adjustably bolted into similarly-located holes in a transverse angle bracket secured to the forward portion of the trailer frame.

In the drawings:

FIG. 1 is a side elevation, partly in vertical section, of an anti-sway trailer hitch, according to one form of the present invention, looking in the direction of the broken line 1—1 in FIG. 2, with the righthand safety chain omitted;

FIG. 2 is a top plan view of the anti-sway trailer hitch of FIG. 1, showing in dotted lines the towing vehicle, the turning circle and the position of the tow bar in an extreme right turn;

FIG. 3 is a rear elevation of the trailer angle bracket looking in the direction of the arrows 3—3 in FIG. 2;

FIG. 4 is a rear elevation of the adjustment plate bolted to the angle bracket, looking in the direction of the arrows 4—4 in FIG. 2;

Figure 5:
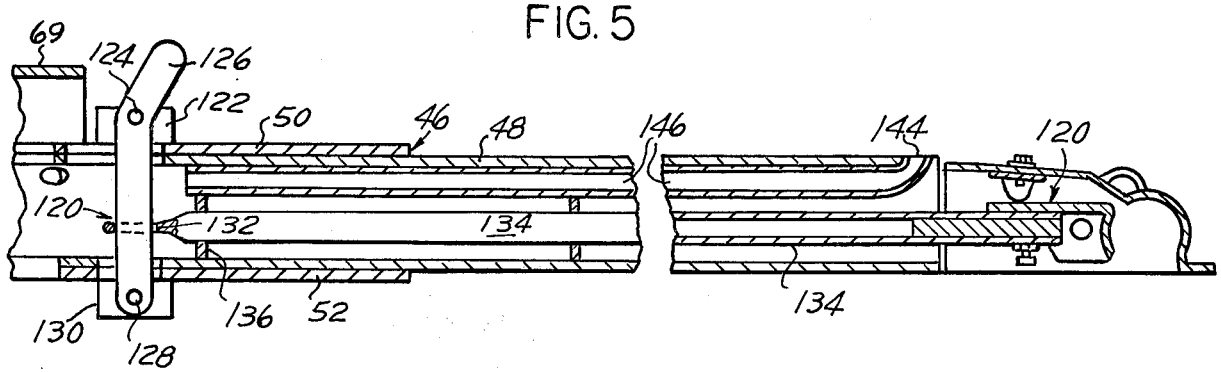
FIG. 5 is a central vertical section, partly broken away to conserve space, of the forward coupling ball release mechanism.

Referring to the drawings in detail, FIGS. 1 and 2 show an antisway trailer hitch, generally designated 10, which is guided at its rearward end in a rearward guidance device 12 and at its forward end is provided with an extensible and retractible coupling device, generally designated 14, connected to the towing vehicle, generally designated 15, such as a conventional pick-up truck. The rearward guidance device 12 (FIGS. 1, 3 and 4) includes an elongated angle bracket 16, the upper horizontal flange 18 of which is welded or otherwise secured to the converging forward frame members 20 of the trailer 22 of which it is a part. The forward vertical flange 24 of the angle bracket 16 has a pair of verticallyelongated coupling holes 26 arranged between three bolt holes 28, the latter of which receive three bolts 30 (FIG. 2) by which an adjustment plate 32 is adjustably secured to the angle bracket 16 through three vertically-elongated bolt holes 34. The adjustment plate 32 also includes a pair of circular holes 36 champfered at their upper edges 38 to receive a pair of laterally-spaced parallel pointed pins 40 (FIGS. 1 and 2). The pins 40 are welded or otherwise secured to the rearward ends of a pair of laterally-spaced channel parallel members 42 constituting the bifurcated rearward member 44 of a tow bar, generally designated 46. The tow bar 46 in addition to the two laterally-spaced parallel members 42 has a single forward member or tongue 48, of hollow box-section form welded or otherwise firmly secured to the parallel members 42 of the rearward section 44 of the tow bar 46 by upper and lower gusset plates 50 and 52 respectively. The gusset plates 50 and 52 are provided at their rearward ends with rearwardly-extending slots 54 (FIG. 2).

In attaching the rearward members 44 of the tow bar or draw bar 46 to the trailer 22, the elongated angle bracket 18 is temporarily placed at the most suitable location extending across the converging trailer frame side members 20, whereupon its ends are then cut off obliquely in alignment with the side members 20. The angle bracket 18 is then welded or otherwise secured to the trailer frame side members 20 at the above-selected location. The mounting plate 32 is then bolted loosely thereto by means of the bolts 30 passing through the vertically-elongated bolt holes 34 and the bolt holes 28. The pins 40 on the ends of the parallel rearward members 42 are then moved into their respective holes 36 in the mounting plate 32 firmly to the angle bracket 18. The depending brace plates are then bolted to the webs of the parallel channel members 42 by means of the bolts 59.

The converging trailer forward frame members 20 at approximately their forward ends are provided with an approximately triangular rearwardlyextending flanged platform 56 to which are secured parallel depending brace plates 58 vertically slotted to receive bolts 59. Mounted upon the platform 56 is a conventional trailer jack 60, the movable portion of which is actuated by a hand crank 62 to raise or lower the screw-actuated plunger 64 (FIG. 1) so as to project the plunger 64 downward into supporting position of the forward end of the trailer 22 when the plunger 64 reaches the level of the ground G. The forward end of the platform 56 is provided with a rearward socket member 66 which cooperates with an upstanding rearward ball member 68 which cooperatively form a rearward ball coupling, generally designated 70. FIG. 1 shows only the stem of the ball member 68, which is mounted upon a support member 69 on the plate 50, the ball itself being concealed within the socket member 66.

Mounted on the upper end of the trailer jack 60, as by the U-connector 72, is an outrigger 74 (FIG. 2), to the opposite ends of which are secured reflector elements 76 for assistance to the operator of the towing vehicle 15 in executing a maximum turn. Mounted on the upper gusset plate 50 is an electrical connection coupling 78 from which an electrical cable 80 extends between one of the trailer frame members 50 and thence to the trailer 22 in one direction and in the other direction into the interior of the tow bar 46 and thence to the towing vehicle 15.

Mounted on the frame side members 82 of the towing vehicle 15 near the opposite ends of the rear axle housing 84 are two depending support plates 86 bolted or otherwise secured to the side members 82. Welded or otherwise secured to the lower ends of the support plates 86 and extending therebetween is a hollow box-section beam 88 placed as close as is practical to the differential housing 90 and carrying an arcuate upstanding shield 92. Cross-corner braces 93 extending obliquely between the support plates 86 and the beam 88 and welded at their opposite ends thereto strengthen the towing vehicle mounting structure, generally designated 95, formed thereby. Mounted on the central portion of the beam 88 is the stem of the forward coupling ball 94 which cooperates with the forward coupling socket 96 of a forward trailer coupling, generally designated 98, mounted on the forward end of the single forward member or tongue 48 of the tow bar 46. The forward trailer coupling 98 is located immediately behind the differential housing 90 so as to be as near as is practical to the differential housing 90, and also to locate the center of the forward coupling ball 94 (only the stem of which is visible) substantially in the same horizontal plane as the axis of rotation of the rear axle 100.

Welded or otherwise secured to the under side of the single forward member or tongue 48 of the tow bar 46 near the forward end thereof is an anchorage eye 102 which is connected as by safety hooks 104 to the rearward ends of two safety chains 106. Connected to the forward ends of the safety chains 106 as by connectors 108 are the rearward ends of flexible cables 110, preferably flexible steel stranded cables. The safety chains 106 diverge forwardly from the anchorage eye 102 (FIG. 1) and the cables 110 to which they are respectively connected pass through laterally-spaced inner guide eyes 112 mounted on the underside of the beam 88 and thence through forward lower guide eyes 113 whence they pass upward through forward upper guide eyes 114 and rearward through rearward upper guide eyes 116. From the rearward upper guide eyes 116 (FIG. 2) the cables 110 pass transversely across the space between the towing vehicle frame side members 82 and terminate in hooks 118 detachably secured to the rearward upper guide eyes 116 on opposite sides of the towing vehicle 15 from the rearward upper guide eye 116 through which each cable 110 has just passed.

The coupling socket 96 of the forward trailer coupling 98 is locked and unlocked by the forward ball catch locking mechanism, generally designated 120, shown in FIG. 5. Mounted on the upper gusset plate 50 are two angle members 122 connected by a pivot pin 124 to the upper portion of a manual locking lever 126 which is pivoted at its lower end to a pivot pin 128 extending between lower angle brackets 130 welded or otherwise secured to the lower gusset plate 52. The upper and lower gusset plates 50 and 52 and the upper and lower walls of the tongue 48 are slotted to permit swinging of the lower portion of the hand lever 126. Intermediate the pivot pins 124 and 128 the hand lever 126 passes through a hole 132 in the flattened rearward end 133 of a tubular operating member 134 which is reciprocable in apertured transverse guide members 136.

Secured to the forward end of the tubular member 134 within the forward ball socket housing 138 is a ball catch 140 having a concave spherical forward surface 142 adapted to matingly engage the ball portion of the coupling ball of the forward trailer coupling 98. Immediately adjacent the housing 138 is the curved outlet 144 of an electrical cable conduit 146 adapted to receive the electrical cable 80, the forward portion of which beyond the outlet 144 extends upward to an electrical cable coupling 148. Adjacent its connection to the ball catch 140, the tubular member 134 is provided with a plug 150 into which a connection bolt 152 extends. As a consequence of this construction, when the hand lever 126 is pulled rearwardly to the left in FIG. 5, the tubular member 134 and the ball catch 140 at its forward end are likewise pulled to the left, thereby disengaging the contact surface 142 from the ball portion of the forward coupling ball 94 so as to enable coupling or uncoupling therewith. Reversing the direction of the hand lever 126 by swinging it forward to the right in FIG. 5 causes the spherical portion 142 of the ball catch 140 to re-engage the ball 94 and re-couple the towing vehicle 15 to the trailer 22.

In the operation of the invention, to couple the trailer 22 to the towing vehicle 15, let it be assumed that the trailer 22 is parked by itself away from the towing vehicle and that its forward end is resting on the downwardly-extended plunger 64 of the trailer jack 60, as indicated by the dotted line position in FIG. 1. Let it also be assumed that the hooks 118 have been detached from their respective upper rearward eyes 116 as shown in FIG. 2 and attached to the opposite rearward eyes 116, thereby creating a slack in each of the cables 110 equal in length to the separation of the rearward eyes 116. Let it further be assumed that the safety hooks 104, being of course detached from the anchorage eye 102, have been pulled rearwardly so as to take up this slack in the cables 110, and have been hooked onto the nearest upper rearward eyes 116 for convenience of stowage. Let it finally be assumed that the coupling lock release lever 126 has been pulled rearwardly to the left in FIGS. 1 and 5, consequently pulling the tubular member 134 and the forward coupling ball catch 140 to the left, thereby opening the socket member 96 to receive the ball 94.

To couple the trailer 22 to the towing vehicle 15, the latter vehicle is backed until the rearward end of the towing vehicle 15 has arrived approximately at the forward end of the two bar 46 and above the anchorage eye 102. The safety hooks 104 are now unhooked from their respective temporary attachments to the upper rearward eyes 116 on the same sides of the vehicle as their respective chains 106, and are then connected to the anchorage eye 102. The towing vehicle 15 is then backed further over the tow bar 46 until it arrives approximately at the position shown in FIGS. 1 and 2. The rearward ends of the cables 110 are then pulled rearwardly by their hooks 118, whereupon their forward ends pull upon the safety pins 106 and thereby guide the socket member 96 of the forward trailer coupling 98 over the forward ball member 94. The shield 92 prevents excessive backing of the towing vehicle 15.

When the forward coupling members 94 and 96 have been thus positioned by being guided into place by pulling the cables 110, the operator by turning the crank 62 moves the trailer jack plunger 64 upward so as to lower the tongue 48 and consequently couple the socket member 96 to the ball member 94 of the forward coupling 98. The coupling lock release lever 126 is then shifted to the right to move the ball catch 140 to lock the ball 94 in the socket member 96 (FIG. 5). The slack in the cables 110 is then taken up and the hook 118 at the end of each cable 110 connected to the nearest rearward upper eye 116, so that the final section of each cable 110 extends across the rearward end of the towing vehicle 15 as shown in FIG. 2 to the eye 116 into which its respective hook 118 is inserted.

Figure 6:
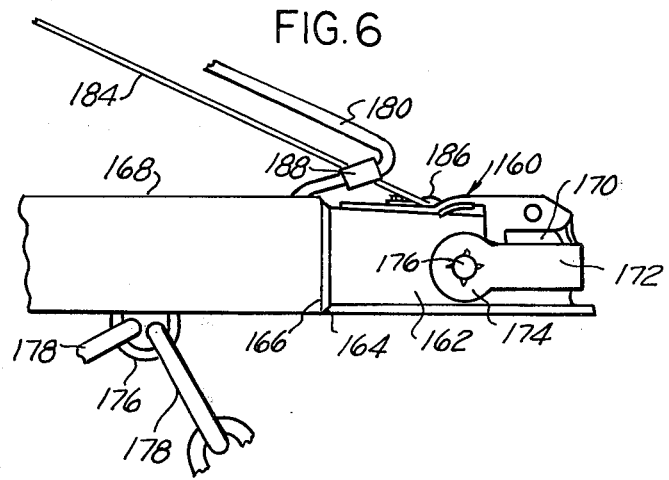
FIG. 6 is a fragmentary side elevation of a modified tongue coupling device.
Figure 7:
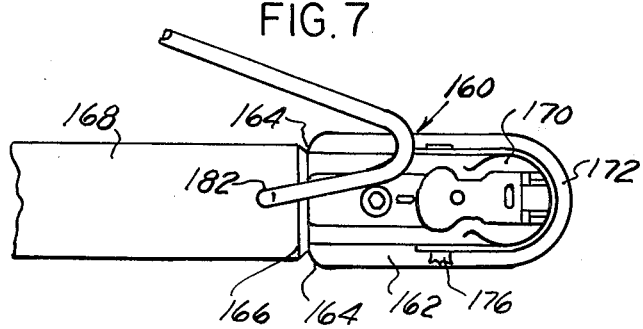
FIG. 7 is a top plan view of the modification shown in FIG. 6.

The modified trailer coupling device, generally designated 160, shown in FIGS. 6 and 7 is generally similar to the coupling device 98 of FIGS. 1 to 5 inclusive, except that the remotely-guided and operated coupling arrangement 10 together with its guidance cables 118 and its forward ball catch locking mechanism 120 (FIG. 5) are omitted and the operator must be willing to crawl under the towing vehicle 15 to perform the coupling operation. The device 160 is mounted on a supporting structure 162 which is welded or otherwise secured as its rearward end as at 164 to the forward end 166 of the trailer tongue 168. The latter is similar to the tongue 48 but omits the remotely-actuated ball catch locking mechanism 120 of FIG. 5. Instead, the ball socket 170 is locked in position on the ball 94 (FIG. 1) by a U-shaped vertically-swinging retainer 172, the enlarged rearward ends 174 of which are pivotally mounted on a pivot pin 176 passing horizontally through the supporting structure 162. The ball socket 170 and its associated parts shown in FIGS. 6 and 7 are conventional, except for the U-shaped pivoting bail or retainer 172, and their details are beyond the scope of the present invention. As in the trailer tongue 48 of FIGS. 1 and 2, an anchorage eye 176 is welded or otherwise secured to the underside of the tongue 168 near its forward end 166 (FIG. 6) and safety chains 178 are secured thereto and extend forward to the towing vehicle. When the bail or retainer 172 is swung upward into a vertical position, it serves as a convenient handle for guiding the coupling socket 170 into alignment with coupling ball 120.

As before, an insulated electrical conductor cable 180 passes forward through the interior of the trailer tongue 168 and emerges through an aperture 182 (FIG. 7) near its forward end 166 for conducting electric current from the towing vehicle to the trailer. A wire 184, preferably of steel, is secured as its forward end to an eye 186 on the supporting structure 162 and is taped or otherwise secured at 188 to the electric conductor cable 180 in order to prevent it from moving around or conflicting with the coupling device 160 in an undesired way during travel. The upper or rearward end of the cable wire 184 is fastened to the rearward end of the towing vehicle 15 and also serves to keep the electrical conductor cable 180 up and away from the tongue 168 and coupling device 160.

In the coupling operation of the modified trailer coupling device 160 shown in FIGS. 6 and 7, the trailer jack 60 (FIG. 1) is raised or lowered by the hand crank 62 in order to position the forward coupling socket 170 at a level slightly above that of the forward coupling ball 120. The operator then backs the truck or other towing vehicle to bring the ball 94 beneath the socket 170, aided by the shield 92. The shield 92 serves as a stop to warn the operator that he has arrived at the correct location for coupling when he feels the engagement of the shield 92 with the forward end of the coupling socket 146 during backing. By operating the hand crank 62 of the trailer jack 60 in the reverse direction, he then lowers the forward coupling socket 170 upon the forward coupling ball 94, aided by his grasp of the bail or retainer 172 when the latter has been raised into a vertical position around the pivot pin 176. When coupling has been completed manually in this manner, the operator swings the bail or retainer 172 downward into its horizontal position (FIGS. 6 and 7), thereby additionally securing the socket 170 against being dislodged from the ball 94 during travel, and thus serving as an additional safeguard in addition to the locking device with which the conventional coupling device 160 is equipped.

The arrangement of the support 86, 88 secured to and depending from the rearward portion of the towing vehicle frame 82 and positioning the forward trailer coupling 98 rearwardly of and immediately adjacent the differential housing 90, as well as on substantially the same horizontal plane as the axis of the rear axle 100 and movable independently of the differential housing 90 and rear axle 100, substantially eliminates side sway of the vehicle during transportation, yet permits the differential housing 90 and rear axle 100 to move upward and downward rapidly on a bumpy road without causing a similar rapid motion of the support 86, 88 and forward coupling 96. In this respect, it has been found in actual operation to be greatly superior to the conventional coupling connected to the rear bumper of the towing vehicle or to other portions thereof remote from the rear axle of the towing vehicle. At the same time, the position of the forward coupling 98 on substantially the same plane as the axis of the axle 100 not only provides ample road clearance but also avoids the serious vertical leverages present in prior couplings by reason of the couplings being positioned higher or lower than the horizontal plane through the axis of the rear axle of the towing vehicle 15.

To uncouple the trailer 22 from the towing vehicle 15, the foregoing procedure is reversed. The lock release lever 126 is pulled to the left to release the ball catch 142 from the forward coupling ball 94. The hooks 118 are disconnected from their respective rearward guide eyes 116 and the socket member 96 lifted away from the ball member 94 as a result of turning the hand crank 62 so as to lower the plunger 64 of the trailer jack 60 into the dotted line position of FIG. 2 and consequently raise the tow bar 46. As the towing vehicle 15 moves away from the tongue 48 of the draw bar 46, the relative motion between the two vehicles 22 and 15 causes the safety chains 106 to pull their respective cables 110 rearwardly of the towing vehicle 15 so as to take up the slack therein resulting from the disconnecting of the hooks 118 from the guide eyes 116 shown in FIG. 2. When the rearward end of the towing vehicle 15 passes over the forward end of the tongue 48, the safety hooks 104 on the safety chains 106 may be disconnected from the anchorage eye 102 of the draw bar 46 and reconnected to their respective upper rearward eyes 116 or to any other suitable location on the towing vehicle 15. This then enables the towing vehicle 15 to be moved completely away from the trailer 22.

I claim:

1. An anti-sway trailer hitch construction adapted to be connected between the forward portion of the frame of a trailer and the rearward portion of the frame of a conventional towing vehicle having a rear axle with a transverse axis or rotation and differential gearing within a differential housing, said construction comprising an elongated tow bar having a forward portion and a rearward portion, means on said rearward portion of said tow bar for attaching said tow bar to the forward portion of the trailer frame, a forward coupling device support structure adapted to be secured to and depend from the rearward portion of the towing vehicle frame and extending downward therefrom into a position immediately behind and adjacent the differential housing, and a forward coupling device having a first coupling element mounted on said support structure immediately behind and adjacent the differential housing and disposed in substantially the same horizontal plane as the axis of rotation of the rear axle, said forward coupling device support structure and said first coupling element being movable unitarily with the rearward portion of the towing vehicle frame but movable independently of the towing vehicle differential housing and rear axle, said forward coupling having a second coupling element mounted on said forward portion of said tow bar and separably engageable with said first coupling element in coupling relationship therewith.

2. An anti-sway trailer hitch construction, according to claim 1, wherein said forward coupling device support structure comprises a pair of vertical support members disposed in laterally-spaced parallel relationship and adapted to be secured at their upper ends to and depend from the rearward portion of the towing vehicle frame and a transverse support member secured to and extending between the lower portions of said vertical support members, said first coupling element being mounted on said transverse support member.

3. An anti-sway trailer hitch construction, according to claim 2, wherein a shield member is mounted on said transverse support member forward of said first coupling element.

4. An anti-sway trailer hitch construction, according to claim 2, wherein said transverse support member and said vertical support member have multiple guide elements thereon disposed in spaced relationship to one another and wherein elongated flexible tow bar positioning means are connected to said forward portion of said tow bar and extend first laterally and then upwardly therefrom through said multiple guide elements and terminate adjacent the rearward portion of the towing vehicle frame.

5. An anti-sway trailer hitch construction, according to claim 4, wherein said plural guide elements are disposed on opposite sides of said first coupling element on said transverse support member and on said vertical support, and wherein said elongated flexible tow bar positioning means includes a pair of flexible cables connected to said forward portion of said tow bar and extending laterally in opposite directions therefrom and upwardly through said multiple guide elements.

6. An anti-sway trailer hitch construction, according to claim 5, wherein trailer safety chains are connected between said forward portion of said tow bar and said cables.

7. An anti-sway trailer hitch construction, according to claim 1, wherein said forward portion of said tow bar has an anchorage element secured thereto, wherein said support structure has spaced guide elements mounted thereon in laterally and upwwardly spaced positions relatively to said anchorage element and has elongated flexible tow bar positioning means connected to said anchorage element and disposed in said guide elements for longitudinal motion therethrough.

8. An anti-sway trailer hitch construction, according to claim 1, wherein said forward portion of said tow bar comprises a single tow bar tongue structure, wherein said rearward portion of said tow bar comprises a pair of laterally-spaced substantially parallel members terminating rearwardly in longitudinally-extending parallel elements, and wherein a laterally-elongated bracket member is adapted to be secured to the forward trailer frame portion and has laterally-spaced apertures aligned with and adjustably slidably receiving said parallel elements.

9. An anti-sway trailer hitch construction, according to claim 8, wherein a rearward coupling device is mounted on said tow bar forwardly of said parallel elements in longitudinally-spaced relationship therewith and is adapted to be secured to the forward trailer frame portion.

* * * * *